United States Patent Office 2,819,303
Patented Jan. 7, 1958

2,819,303

PROCESS FOR PRODUCTION OF β-ALANINE

Richard Griffith, Shrewsbury, Walter Anthony Di Salvo, North Arlington, Roland Kapp, Newark, and Louis T. Rosenberg, West Englewood, N. J., assignors to Nopco Chemical Company, Harrison, N. J., a corporation of New Jersey No Drawing. Application April 6, 1953
Serial No. 347,164

7 Claims. (Cl. 260—534)

This invention relates to beta-alanine and to the preparation thereof. More particularly, it relates to a process by which excellent yields of beta-alanine in a high degree of purity are obtained.

Beta-alanine, which is also referred to quite frequently as beta-aminopropionic acid, is an important intermediate used in the preparation of pantothenic acid. Because of its value in the synthesis of this compound, considerable time and effort have been expended in an effort to develop an economical and practical method for preparing beta-alanine. The most successful of the prior art processes have involved the synthesis of beta-alanine by the hydrolysis of a suitable nitrile. Some of the hydrolysis procedures described in the literature involve the use of alkaline hydrolyzing agents while others employ acid hydrolyzing agents. However, for a variety of reasons the methods previously developed have not been altogether satisfactory for large scale commercial operations. Thus, for example, when beta-aminopropionitrile is subjected to alkaline hydrolysis, the alkali metal salt of beta-alanine is invariably the end product. In U. S. Patent 2,336,067, it is disclosed that the production of beta-alanine by hydrolysis of a nitrile in the presence of an alkali is commercially impractical since the salt of beta-alanine can be isolated only by means of involved and tedious procedures. Moreover, the production of beta-alanine by alkaline hydrolysis processes is complicated further both in that an additional step is required to convert the isolated salt into the free acid and in that the free acid is thereafter isolated only with great difficulty. The difficulties encountered when the hydrolysis is carried out in the presence of an acid are analogous to those encountered when alkaline hydrolysis is employed since the isolation and purification of the free acid can be accomplished only with some degree of difficulty. Thus, although methods for the production of beta-alanine are known in the art, the preparation thereof has always been materially hindered by the inability to isolate the product with any reasonable or practical degree of facility. Moreover, since the isolation of beta-alanine has heretofore been so difficult, a continuous process for the production of beta-alanine has never been successfully developed. Furthermore, the prior art processes were, for the most part, characterized by the fact that they resulted in the attainment of relatively low yields. The present invention, however, overcomes all of the disadvantages which are inherent in the prior art procedures and, hence, constitutes a substantial advance in the art.

It is the object of this invention to provide a new and improved method for the production of beta-alanine.

A further object of this invention is to provide a continuous method for the production of beta-alanine.

Other objects of this invention will in part be obvious and will in part appear hereinafter.

It has been discovered that the foregoing objects are readily accomplished by a process which involves the steps of hydrolyzing with an alkali the product which results from reacting acrylonitrile with aqueous ammonia and subsequently passing the product of said hydrolysis, in sequence, through a column containing a cation exchange resin and through a column containing an anion exchange resin.

In the process of the present invention, the starting material employed is beta-aminopropionitrile or a mixture containing beta-aminopropionitrile such as is obtained by reacting aqueous ammonia with acrylonitrile. The preparation of beta-aminopropionitrile by the reaction of aqueous ammonia with acrylonitrile using a mole ratio of about 2 to 1 is quite well known. Moreover, it is also known that aqueous ammonia and acrylonitrile can be reacted in a mole ratio which appreciably exceeds the 2 to 1 ratio in order to facilitate the reaction and to insure complete convertion of the acrylonitrile present to amine. However, it is not at all practical, nor is it necessary, to carry out this reaction using a mole ratio of ammonia to acrylonitrile which is substantially in excess of about 6 to 1. Preferably, the material employed in the practice of the present invention is the product resulting from the reaction of aqueous ammonia and acrylonitrile in a mole ratio of about 5 to 1.

The conditions under which the reaction of acrylonitrile and aqueous ammonia is accomplished can to some extent be varied. Thus, the reaction can be carried out at a temperature of from about 75° C. to about 150° C. Moreover, pressures within the range of from about 100 lbs. per square inch to about 200 lbs. per square inch can be used. A most satisfactory method for accomplishing this reaction involves the use of temperatures of about 100° C. and pressures of about 150 lbs. per square inch. However, since the reaction of acrylonitrile and ammonia is not, in and of itself, novel and since that reaction has been disclosed in various references, the present invention should not be construed as limited to the foregoing reaction conditions. Rather, the practice of this invention allows the use of any known procedure which results in the complete and successful conversion of acrylonitrile and aqueous ammonia into beta-aminopropionitrile.

The product which results from the reaction of acrylonitrile and aqueous ammonia is actually a mixture of several components. A large portion of the mixture, however, is beta-aminopropionitrile. The other substituents of this mixture, said substituents being present in varying proportions are essentially unreacted ammonia, bis-(beta-cyanoethyl) amine, tris-(beta-cyanoethyl) amine and water. In the preferred embodiment of the invention, this mixture is distilled and the aqueous ammonia and beta-aminopropionitrile which are vaporized during the distillation are condensed and collected as separate fractions. The tris-(beta-cyanoethyl) amine and substantially all of the bis-(beta-cyanoethyl) amine which were present in the original mixture remain, for the most part, as residue in the still and can be discarded. It has been found, however, that the beta-aminopropionitrile distillation fraction contains water and varying small proportions of bis-(beta-cyanoethyl) amine. Moreover, the aqueous ammonia fraction has been found to contain small quantities of beta-aminopropionitrile. Therefore, since beta-aminopropionitrile is the desired product of the amination reaction, the aqueous ammonia distillation fraction containing this material should, for optimum efficiency, be preserved and returned to the reaction mass before proceeding to the next step in the process. The precise manner in which the beta-aminopropionitrile present in the ammonia fraction is returned to the reaction mass and, thereafter, fully utilized will be evident from the description of the subsequent step of the process. Although the preferred practice of the invention embodies the distillation step, it may be omitted, if desired, since the operability of the invention is not predicated on the employment of the step. However, the advantages which acrue from distilling the mass prior to proceeding to the subsequent steps in the process far outweigh any economic advantage which might possibly be gained by the omission of this step. These advantages will more fully appear from the discussion of the invention which follows hereinafter. However, the separation of the desired beta-aminopropionitrile from a substantial portion of bis-(beta-cyanoethyl) amine and from the tris-(beta-cyanoethyl) amine at this early stage in the process almost completely obviates the risk that even the smallest quantity of the products derived from bis or tris-(beta-cyanoethyl) amine which are subsequently produced in the process will escape removal during the anion exchange step where the last traces of such products are normally removed. Therefore, the distillation step is highly recommended.

The beta-aminopropionitrile-containing mixture, regardless of whether it is the distilled fraction of the aqueous ammonia-acrylonitrile reaction product which consists essentially of beta-aminopropionitrile, water and small quantities of bis-(beta-cyanoethyl) amine or whether it is the undistilled reaction product itself which comprises beta-aminopropionitrile, bis-(beta-cyanoethyl) amine, tris-(beta-cyanoethyl) amine and aqueous ammonia is subsequently hydrolyzed in the presence of an alkali, preferably an alkali metal hydroxide. The hydrolysis reaction converts the beta-aminopropionitrile to the alkali metal salt of beta-alanine (alkali metal salt of beta-aminopropionic acid) and it converts the bis-and-tris-(beta-cyanoethyl) amine, if present, to the alkali metal salts of bis-and-tris-(beta-carboxyethyl) amine respectively. If it is present in the reaction mass, ammonia is evolved during the reaction and can be readily recovered, if desired. In the practice of this invention, any known alkaline hydrolyzing agent can be employed. Thus, for example, alkalis such as sodium hydroxide, potassium hydroxide, barium hydroxide, etc. are well suited for use. However, since sodium hydroxide is readily available and relatively inexpensive, its use in the present process is preferred. The addition of the alkali to the mass to be hydrolyzed can be accomplished in either of two ways. Thus, when the mixture to be hydrolyzed is the distilled fraction containing beta-amino-propionitrile, the alkali is dissolved in the aqueous ammonia fraction preserved from the distillation step and the solution thus obtained is added to the reaction mass. When, however, the mixture to be hydrolyzed has not been previously distilled, the alkali is dissolved in water and the aqueous alkaline solution thus obtained is added to the undistilled mass. The concentration of the alkaline solution which is added to the mass, whether the solution is the alkali dissolved in the aqueous ammoniacal fraction of the distillation step or whether the solution is the aqueous alkali solution, can be varied within rather wide limits. Thus, the aqueous or aqueous ammonia solution can have dissolved therein from about 5% to about 25% by weight of alkali. In the actual practice of the invention, however, it is preferred that the alkali solution which is added to the reaction mass to initiate hydrolysis have an alkali concentration of from about 5% to about 10% by weight. The quantity of alkali used in carrying out the hydrolysis reaction may, of course, be varied, but at all times, at least a stoichiometrically equivalent amount of alkali should be employed. It is preferred however that substantially more than an equivalent amount of alkaline hydrolysis agent be used and hence, in the preferred practice of the invention, an excess of approximately 10% is ordinarily employed.

The hydrolysis step is carried out at a temperature which is at or near the reflux temperature of the mixture which is to be hydrolyzed. The refluxing time may be varied; however, it has been found that in most cases complete hydrolysis will be accomplished most efficiently when the mixture is refluxed for a period of about eight hours. The extent to which the conditions employed in carrying out the hydrolysis step may be varied will be evident to those skilled in the art. Since the hydrolysis step, itself, is well known, any of the variations heretofore disclosed in the art for carrying out this step may be suitably utilized.

At the completion of hydrolysis, the hydrolysate mixture is diluted with water to a concentration ranging from about 1% to about 10% by weight, with respect to the anticipated yield of beta-alanine. Thus, prior to the dilution of the hydrolysate with water the yield of beta-alanine is approximated. It is not intended that the scope of the invention be limited to any particular method for determining the theoretical yield of beta-alanine since any method which permits a fairly accurate estimation of the quantity present will be quite suitable. However, one of the simplest methods available involves a determination of the quantity of beta-aminopropionitrile present in the mixture prior to the hydrolysis thereof. The determination is carried out by titration, for beta-aminopropionitrile, with dilute mineral acid. Having once determined the quantity of beta-aminopropionitrile which will be subjected to hydrolysis in any particular batch, the determination of the theoretical yield of hydrolysis product, that is, the alkali metal salt of beta-aminopropionic acid and the theoretical yield of beta-alanine produced therefrom is a relatively simple calculation. Obviously, the accuracy of these calculations will be materially impaired if the sample titrated contains substantial quantities of extraneous alkaline materials. For this reason, the determination of the quantity of beta-aminopropionitrile present should be conducted on a sample from which ammonia, tris-(beta-cyanoethyl) amine and substantially all of the bis-(beta-cyanoethyl) amine has been removed. Thus, if the product of the reaction of aqueous ammonia and acrylonitrile has been distilled, the determination is conducted on a sample of the beta-aminopropionitrile distillation fraction. If, however, the mass resulting from the amination step has not been distilled, it will be necessary to distill a sample of this mass in order to determine the quantity of beta-aminopropionitrile actually present. The presence of even small quantities of extraneous alkaline materials in the sample to be titrated will render the result obtained by titration to some extent inaccurate. Thus, the presence of bis-(beta-cyanoethyl) amine in the beta-aminopropionitrile fraction, even in the small quantities in which it is present in the fraction of beta-aminopropionitrile distilled from the product of the reaction of aqueous ammonia and acrylonitrile will impair the accuracy of the results obtained. However, errors of this magnitude are inconsequential insofar as the practice of the present invention is concerned since the hydrolysate can be diluted with water, with respect to beta-alanine within rather wide limits without affecting the operability of the invention to any substantial degree. Thus, if desired, the hydrolysate can be diluted to a concentration is less than about 1% by weight with respect to beta alanine. However, since the dilution of the mass below this concentration neither serves a useful purpose nor is at all practical from the standpoint of production of beta-alanine on a commercial level, the dilution of the mass to a concentration which is substantially below 1% by weight, with regard to beta-alanine, is not recommended. Moreover, although it is entirely possible to operate at concentrations which substantially exceed about 10%, the use of such highly concentrated solutions is not recommended since by doing so, excessive overheating, and all the disadvantages attendant thereon, ensues during the reactions involved in the ion exchange mechanism of the subsequent steps. Thus, for optimum efficiency the hydrolysate should be diluted with water to a concentration of between about 1% and about 10%, and preferably about 5% by weight, based on the anticipated yield of beta-alanine. In its broadest aspects, the practice of the present invention encompasses the dilution of the hydrolysate to the designated concentration with ordinary tap water as well as with deionized or distilled water. However, when available, the use of deionized or distilled water is highly preferred.

Following the dilution of the hydrolyzed mass with water, the aqueous solution of the mass is passed through a column containing a cation exchange resin of the carboxylic acid type. As the name implies these exchange resins are characterized by the presence therein of many carboxylic acid groups. As examples of some of the commercially known and available carboxylic acid type cation exchange resins which are suitable for use herein, the following are mentioned: Amberlite IRC–50 (Rohm & Haas Company, Philadelphia, Pa.); Duolite CS–100 (Chemical Process Company, Redwood City, California); Alkalex (Research Products Corp., New York, New York); Permutit 216 and Permutit H (Permutit Company, New York, New York). Moreover, cation exchange resins of the carboxylic acid type other than those specifically mentioned herein will also be quite suitable for use in this process. The rate of flow through the cation exchange resin should be regulated so that optimum and efficient exchange is accomplished. However, the rate of flow actually employed in any particular embodiment of the invention will be variable depending upon the many factors in the process itself which affect the rate of exchange. Thus, the rate of exchange which occurs within the resin exchange column will vary with factors such as the capacity of the resin, the diameter of the column, the concentration of the entering solution, etc. In the actual practice of the invention, the optimum rate of flow through the particular resin column being employed can be readily determined by making a few preliminary runs, employing varying rates of flow, and then analyzing the results obtained on each of those runs. The passage of the hydrolysate solution through a cation exchange resin of the carboxylic acid type results in an interchange of ions, the alkali metal ions present in the entering solution being interchanged with the hydrogen ions of the carboxylic acid groups of the exchange resin. Thus, the effluent of the cation exchange resin column is essentially a mixture of water, beta-alanine and bis-(beta-carboxyethyl) amine. If the mixture obtained by reacting acrylonitrile with aqueous ammonia was not previously distilled, the effluent, of course, will be a mixture of water, beta-alanine, bis-(beta-carboxyethyl) amine and tris-(beta-carboxyethyl) amine.

This effluent mixture is, thereafter, passed through a column containing an anion exchange resin of the amine type. As examples of the commercially known and available anion exchange resins of the amine type which are well suited for use in our process, the following are mentioned: Permutit CCG (Permutit Co., New York, N. Y.); and, Wofatit M (I. G. Farben, an anion exchange resin made from m-phenylene diamine, polyethylene diamine and formaldehyde). Amine-type anion exchange resins other than those specifically mentioned here can also be employed. In the practice of the present invention, the amine-type anion exchange resin functions specifically to remove from the entering solution any and all bis-(beta-carboxyethyl) amine and tris-(beta-carboxyethyl) amine present therein. The amine-type anion exchange resin selected for use, therefore, must be one which will not react with beta-alanine but which will react with the bis- and tris-(beta-carboxyethyl) amine. In general, amine-type anion exchange resins which consist of primary, secondary and tertiary amines, and mixtures of these, are well suited for use herein. However, anion exchange resins which consist of amines which are strong bases, such as quaternary ammonium type exchange resins, are entirely unsuitable for use in the practice of this invention. Thus, as it flows through the amine-type anion exchange resin column, beta-alanine, in solution, exists in the form of a zwitter ion, that is a complex ion which is both positively and negatively charged. In this form, the beta-alanine is not reacted upon chemically by an amine of relatively low basicity. Hence, beta-alanine flows through the anion exchange resin completely undisturbed. The free carboxyl groups present in the bis- and tris-(beta-carboxyethyl) amines, however, are reacted upon by the amine of the anion exchange resin employed and are retained in the exchange resin column. If, however, the amine, or the mixture of amines, present in the anion exchange resins column were strongly alkaline, the zwitter-ion configuration of the beta-alanine would be disturbed and as a result not only would the exchange resin of the anion exchange resin column react with the bis- or tris-(beta-carboxyethyl) amine present in the entering solution but the strongly basic amine type anion exchange resin would react with beta-alanine itself and prevent its passage through the column. Obviously such a result is highly undesirable and should be diligently avoided. Hence, for the purposes of the present invention the anion exchange resin selected for use should be an amine type anion exchange resin, the amine groups in said resin being selected from the class consisting of primary, secondary and tertiary amine groups and mixtures of such groups. As pointed out heretofore, the passage of the effluent from the cation exchange resin column through the amine-type anion exchange resin column results in the removal from the solution of bis-(beta-carboxyethyl) amine; or, if the mixture obtained by reacting acrylonitrile with aqueous ammonia was not distilled, it will result in the removal from the solution of bis-(beta-carboxyethyl) amine and tris-(beta-carboxyethyl) amine. Obviously, the greater the quantities of the bis-(beta-carboxyethyl) amine and tris-(beta-carboxyethyl) amine present in the solution entering the anion exchange resin bed, the greater is the possibility that some of it will not be removed and will contaminate the final product. By distilling the product of the amination step, the desired beta-aminopropionitrile will be separated by the distillation from all but a relatively small quantity of the bis-(beta-cyanoethyl) amine and the small quantity thereof that is carried through the succeeding steps in the process will, in the anion exchange step, be removed. However, when proceeding in accordance with any of the various embodiments of this invention, the effluent from the anion exchange resin column will be a substantially uncontaminated aqueous solution of beta-alanine. As was the case with the cation exchange resin, the optimum rate of flow through the anion exchange resin can be readily determined by making a few preliminary runs employing different rates of flow. It has been found that a fairly accurate indication of the efficacy of the reactions involved in the exchange mechanisms of the respective exchange resin columns can be conveniently had from a determination of the electrical conductivity of the solution which passes from each column. Ordinarily, when proceeding in accordance with the preferred embodiment of this invention, the effluent from the cation exchange resin has a conductance of from about 140 micromhos to about 2900 micromhos and the effluent from the anion exchange resin has a conductance of from about 300 micromhos to about 2000 micromhos. By determining the conductance of the effluents from the respective columns at frequent intervals during preliminary trials, in which a product of the requisite purity was obtained, certain conductance patterns will be observed. Extreme variations in the expected pattern during subsequent runs will indicate that the exchange reaction is for one reason or another not proceeding properly. Thus, by making frequent conductance determinations one can tell, for example, when the exchange resin of the column is, or is almost, completely exhausted, that is, in need of regeneration, or when the solution is being passed through the resin column at such a rate that the exchange occurring is incomplete. If desired, the hydrogen ion concentration (pH) of the solutions could be determined frequently for control purposes and used alone or in conjunction with conductance readings. Ordinarily, when proceeding in accordance with the preferred embodiment of this invention, the effluent collected from the cation exchange resin column has a pH from about 4.8 to about 6.4 and the effluent collected from the anion exchange resin will have a pH of from about 7.3 to about 8.4.

The effluent which passes from the anion exchange resin column can be filtered to remove any insoluble foreign matter present. Isolation of beta-alanine is readily accomplished by concentrating the effluent solution to a heavy syrup and subsequently pouring it into a selected solvent. For the present purposes, the solvent chosen for use should be water miscible and should not react with beta-alanine. Moreover, the solvent selected for use should be one in which beta-alanine is insoluble. Thus, for example, solvents such as methyl alcohol, ethyl alcohol, Carbitol (diethylene glycol monoethyl ether, sold by Carbide & Carbon Chemicals Corp., New York, N. Y.), etc., are highly suited for use in this process. However, since methyl alcohol is readily available, relatively inexpensive and readily removable, it is employed in the preferred embodiment of the invention. In effecting the isolation of beta-alanine in the practice of this invention, the mixture of the concentrated aqueous solution of beta-alanine and solvent is preferably cooled to a temperature of about 5° C. Precipitation of beta-alanine immediately occurs. The beta-alanine can thereafter be separated from the solution by filtration. Preferably, it is then dried at a temperature of about 60° C. in a vacuum oven.

It is readily apparent from the preceding description that the steps of the present process are related to each other in such a manner that the synthesis of beta-alanine thereby can be practiced as one continuous process. However, this invention is not to be construed as limited to a continuous process; and, if desired, the sequence of steps disclosed herein can be practiced in a non-continuous manner, that is, as a batch process, with equally excellent results.

The advantages which flow from the practice of the present invention are many and diverse. Thus, the invention provides a continuous or a batch method for preparing beta-alanine which is both efficient and economical. It is efficient due to the fact that high yields of pure beta-alanine are produced thereby. Thus, for example, yields of from about 50% to about 60% of theory based upon the weight of acrylonitrile employed or from about 85% to about 95% based on the weight of beta-aminopropionitrile are ordinarily obtained by the practice of the invention. It is economical in that the raw materials used are readily available and relatively quite inexpensive. Moreover, the process is economical in that the ammonia used in excess and the ammonia formed during the reaction can be recovered, if desired, and reused. Similarly, the ion exchange resins which are employed can be regenerated and used over and over again. A further outstanding feature of the present invention is that it completely obviates the tedious and/or cumbersome isolation and purification steps that are necessary in the practice of the prior art processes.

For a fuller understanding of the nature and objects of the invention, reference should be had to the following examples which are given merely as further illustrations of the invention and are not to be construed in a limiting sense.

Example I

In this example, the synthesis of beta-alanine was carried out as a continuous process. In the process, a ratio of about 5 moles of aqueous ammonia and 1 mole of acrylonitrile were continuously fed into a reaction zone at a temperature of about 100° C. and at a pressure of about 150 lbs. per square inch. In all, the total quantity of acrylonitrile employed was 480 lbs. (9.05 lb. mols). The aqueous reaction product produced was continuously distilled and the ammonia fraction and the beta-amino-propionitrile fractions which were evolved during the distillation were collected separately. A sample of beta-aminopropionitrile was taken and titrated with 0.1 N hydrochloric acid to enable the determination of the actual quantity of beta-aminopropionitrile present in the sample. Calculations showed that the overall yield of beta-aminopropionitrile from acrylonitrile was 376 lbs. or 59% of theory based on the weight of the acrylonitrile employed.

An equivalent weight of sodium hydroxide plus a ten percent excess was thereafter dissolved in the aqueous ammonia fraction obtained from the foregoing distillation step and the solution thus obtained was added to the beta-aminopropionitrile fraction. This mixture was thereafter heated at its reflux temperature for a period of about eight hours. At the end of this time the hydrolyzed mass was diluted with distilled water to a concentration of 5%, based upon the anticipated yield of beta-alanine calculated from the quantity of beta-aminopropionitrile initially employed. This 5% solution was thereafter passed through a column nine feet in height and 40 inches in diameter which was packed with Amberlite IRC-50 (a carboxylic acid type cation exchange resin, sold by Rohm & Haas Co., Philadelphia, Pa.). The solution was passed through this resin-containing column at a rate of about 3.4 gallons per minute. The effluent from the cation exchange resin column was thereafter passed through a column containing Permutit CCG (an ion exchange resin of the amine type, sold by the Permutit Co., New York, N. Y.). The anion exchange resin column was about six feet in height and had a diameter of about eighteen inches. The solution was passed through the column at a rate of about 3.4 gallons per minute.

The effluent of the anion exchange resin was thereafter concentrated by heating under reduced pressure until it became a heavy syrup. The syrup-like liquid concentrate was then poured into methyl alcohol. The beta-alanine immediately commenced precipitating out of solution. The solution was cooled to a temperature of about 5° C. to effect complete precipitation of beta-alanine. The beta-alanine precipitate was thereafter separated from the cold solution by filtration following which it was dried in a vacuum oven at a temperature of about 60° C.

This procedure resulted in the production of 430 lbs. of beta-alanine in a highly pure form. The yield obtained was about 90% of theory, based on the weight of beta-aminopropionitrile.

Example II

In this example, the synthesis of beta-alanine was carried out as a continuous process. For use in this process, beta-aminopropionitrile was prepared in precisely the same manner as that set forth in Example I.

A solution of 12.9 kg. of the aqueous ammonia forerun, vaporized, condensed and collected during distillation of the product resulting from the reaction of aqueous ammonia and acrylonitrile and 1.26 kg. of flaked sodium hydroxide was initially prepared. This solution was added to the beta-aminopropionitrile fraction (2.27 kg.) assaying 59% (19.9 moles). The ensuing mixture was thereafter heated at the reflux temperature thereof, with stirring, for a period of about 8 hours. The weight of the solution at the end of this time was determined to be about 14.57 kg.

One-quarter of this solution or 3.84 kg. was diluted with 2.2 kg. of distilled water. At this dilution, the solution had a concentration of about 5% with respect to beta-alanine. The solution was thereafter passed through a column containing Amberlite IRC-50 (sold by Rohm & Haas Co., Phila., Pa.), a cation exchange resin of the carboxylic acid type. The column had an inside diameter of about 4 inches and a bed depth of about 29 inches. The column contained about 8 lbs. of Amberlite IRC-50 and the solution was passed through said column at a rate of about 3 liters per hour. Substantially cation free beta-alanine solution was collected between the conductance range of 140 to 2900 micromhos and a pH range of 4.8 to 6.4.

This solution was thereafter passed through an anion exchange column which contained Permutit CCG (an anion exchange resin of the amine type, sold by the Permutit Co., New York, N. Y.). The anion exchange resin column had an inside diameter of about 4 inches and a 29 inch bed depth. The effluent, a substantially pure aqueous solution of beta-alanine was collected between conductances of 300–2000 micromhos and over a pH range of 7.3 to 8.4. The solution was thereafter heated and concentrated to a volume of about 2.5 liters, filtered and the filtrate concentrated further to about 800 ml. at which concentration it was a syrupy liquid. The syrup-like fluid was thereafter admixed with about 4 liters of methyl alcohol and the solution thus obtained cooled to a temperature of about 5° C. The beta-alanine immediately precipitated. It was removed from the aqueous alcohol solution by filtration.

There was obtained by this process 413 grams of substantially pure beta-alanine which was soluble in tap water in a ratio of 1 to 3 parts. This represented a yield of 93.4%, based on the weight of beta-aminopropionitrile employed.

Having described our invention, what we claim as new and desire to secure by Letters Patent is:

1. In a process for the production of beta-alanine by the alkaline hydrolysis of the product resulting from the reaction of at least about two moles of aqueous ammonia with about one mole of acrylonitrile, the improvement which comprises diluting the hydrolysis product with water to a concentration of from about 1% to about 10% by weight, with respect to beta-alanine and, thereafter, and in sequence passing the solution thus obtained through a column containing a cation exchange resin of the carboxylic acid type and through an anion exchange resin of the amine type, the amine groups in said anion exchange resin being selected from the class consisting of primary, secondary and tertiary amine groups and mixtures of such groups.

2. In the process for the production of beta-alanine by the alkaline hydrolysis of the product resulting from the reaction of at least about two moles of aqueous ammonia with about one mole of acrylonitrile, the improvement which comprises diluting the hydrolysis product with water to a concentration of from about 1% to about 10% by weight, with respect to beta-alanine and, thereafter, and in sequence passing the solution thus obtained through a column containing a cation exchange resin of the carboxylic acid type and through an anion exchange resin of the amine type, the amine groups in said anion exchange resin being selected from the class consisting of primary, secondary and tertiary amine groups and mixtures of such groups and subsequently admixing the effluent of said anion exchange resin column with an inert, water-miscible solvent in which beta-alanine is substantially insoluble.

3. In the process for the production of beta-alanine by the alkaline hydrolysis of the distillate of the product resulting from the reaction of at least about two moles of aqueous ammonia with about one mole of acrylonitrile, said distillate consisting essentially of beta-aminopropionitrile, water and bis-(beta-cyanoethyl) amine, the improvement which comprises diluting the hydrolyzed distillate with water to a concentration of from about 1% to about 10% by weight, with respect to beta-alanine and, thereafter, and in sequence passing the solution thus obtained through a column containing a cation exchange resin of the carboxylic acid type and through an anion exchange resin of the amine type, the amine groups in said anion exchange resin being selected from the class consisting of primary, secondary and tertiary amine groups and mixtures of such groups.

4. In the process for the production of beta-alanine by the alkaline hydrolysis of the distillate of the product resulting from the reaction of at least about two moles of aqueous ammonia with about one mole of acrylonitrile, said distillate consisting essentially of beta-aminopropionitrile, water and bis-(beta-cyanoethyl) amine, the improvement which comprises diluting the hydrolyzed distillate with water to a concentration of from about 1% to about 10% by weight, with respect to beta-alanine and, thereafter, and in sequence passing the solution thus obtained through a column containing a cation exchange resin of the carboxylic acid type and through an anion exchange resin of the amine type, the amine groups in said anion exchange resin being selected from the class consisting of primary, secondary and tertiary amine groups and mixtures of such groups and subsequently admixing the effluent of said anion exchange resin column with an inert, water-miscible solvent in which beta-alanine is substantially insoluble.

5. In the process for the production of beta alanine by the alkaline hydrolysis of the distillate of the product resulting from the reaction of about five moles of aqueous ammonia with about one mole of acrylonitrile, said distillate consisting essentially of beta-aminopropionitrile, water and bis-(beta-cyanoethyl) amine, the improvement which comprises diluting the hydrolyzed distillate with water to a concentration of from 5% by weight, with respect to beta alanine, and, thereafter and in sequence passing the solution thus obtained through a column containing a cation exchange resin of the carboxylic acid type and through an anion exchange resin of the amine type, the amine groups in said anion exchange resin being selected from the class consisting of primary, secondary and tertiary amine groups and mixtures of such groups and subsequently admixing the effluent of said anion exchange resin with methanol.

6. The process of claim 5, wherein the cation exchange resin is Amberlite IRC–50, a cation exchange resin of the carboxylic acid type.

7. The process of claim 6, wherein the anion exchange resin is Permutit CCG, an anion exchange resin of the amine type.

References Cited in the file of this patent

UNITED STATES PATENTS

| | | |
|---|---|---|
| 2,401,429 | Kung | June 4, 1946 |
| 2,599,757 | Gottfried | June 10, 1952 |
| 2,700,054 | White | Jan. 18, 1955 |

OTHER REFERENCES

Buc et al.: J. Am. Chem. Soc., vol. 67 (1945), pp. 92–94.

Buc et al.: Chem. Ab., vol. 39 (1945), p. 1392.

Winters et al.: Ind. and Eng. Chem., March 1949, pp. 460–463.